INVENTOR.
JOHN A. DI GIORGIO

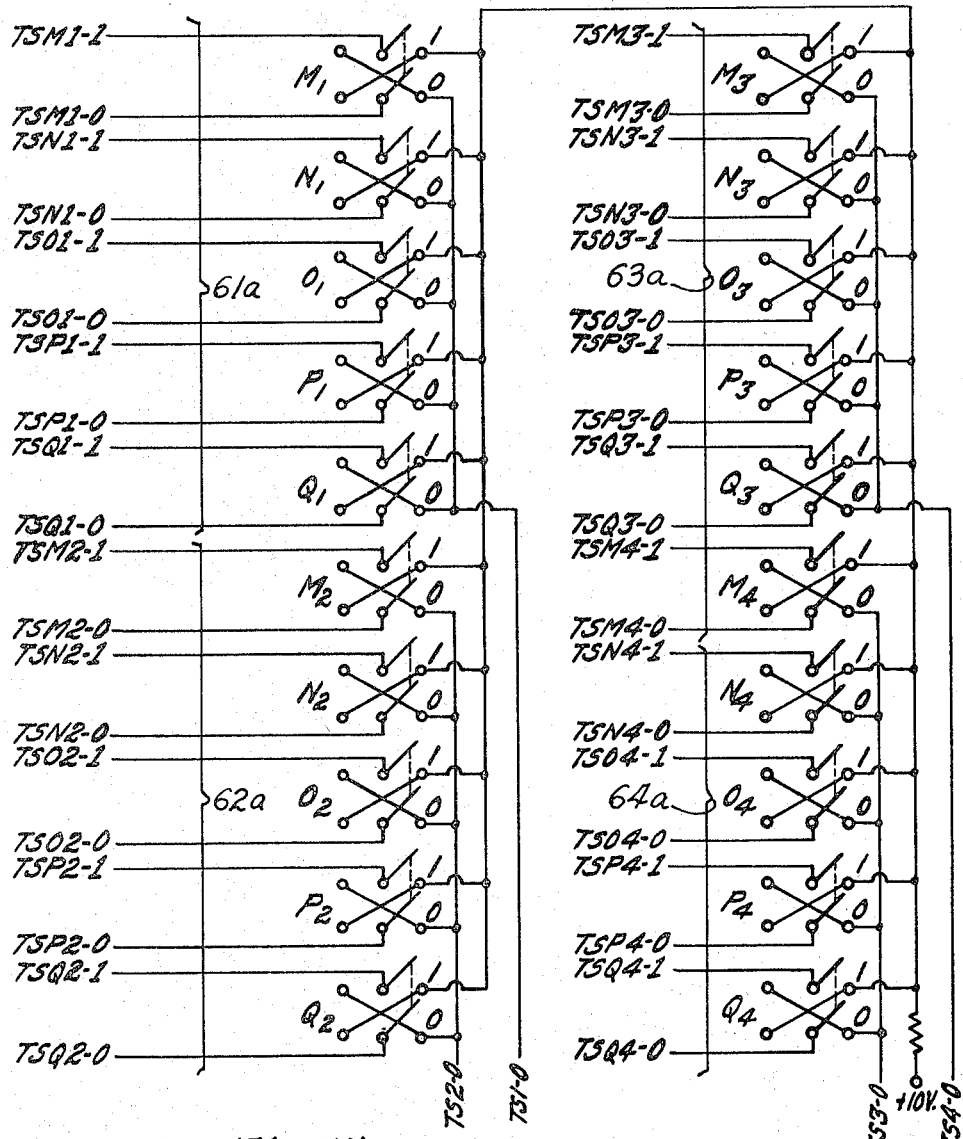
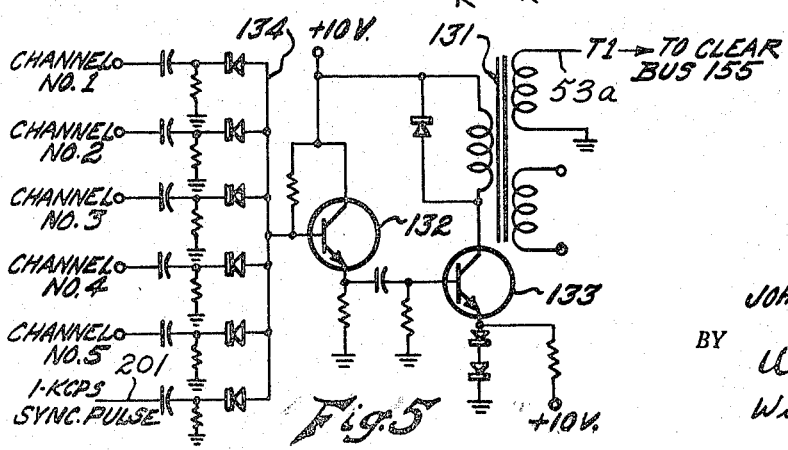
Fig. 4
Fig. 5
INVENTOR.
JOHN A. DI GIORGIO
BY
Willard R. Matthews
ATTORNEYS March 21, 1967 J. A. DI GIORGIO 3,310,776
AUTOMATIC BINARY-CODE ERROR DETECTING SYSTEM
Filed Sept. 28, 1960 7 Sheets-Sheet 5

Fig. 6

INVENTOR.
JOHN A. DI GIORGIO
BY
Wade Kuntz
Willard R. Matthews Jr.
ATTORNEYS

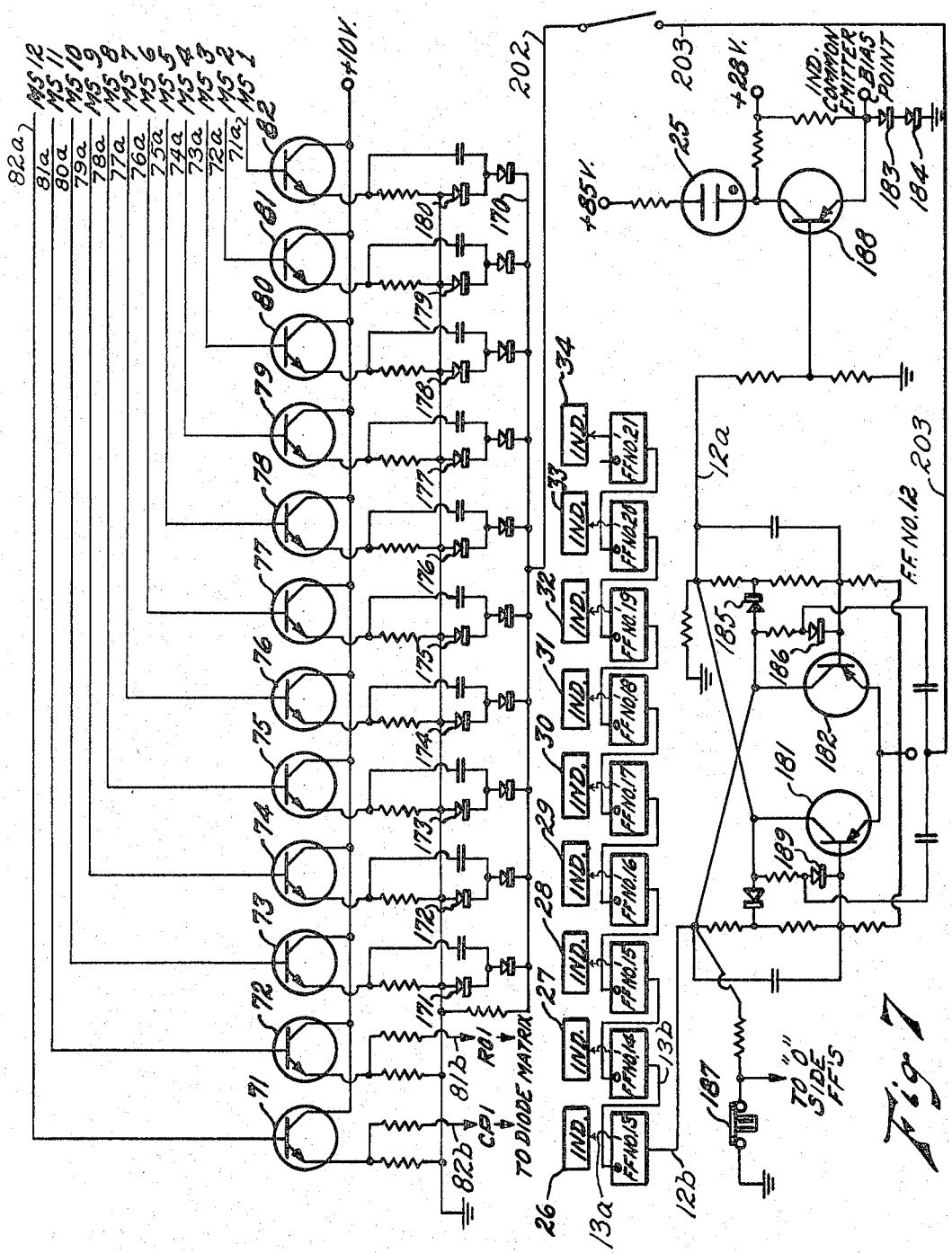

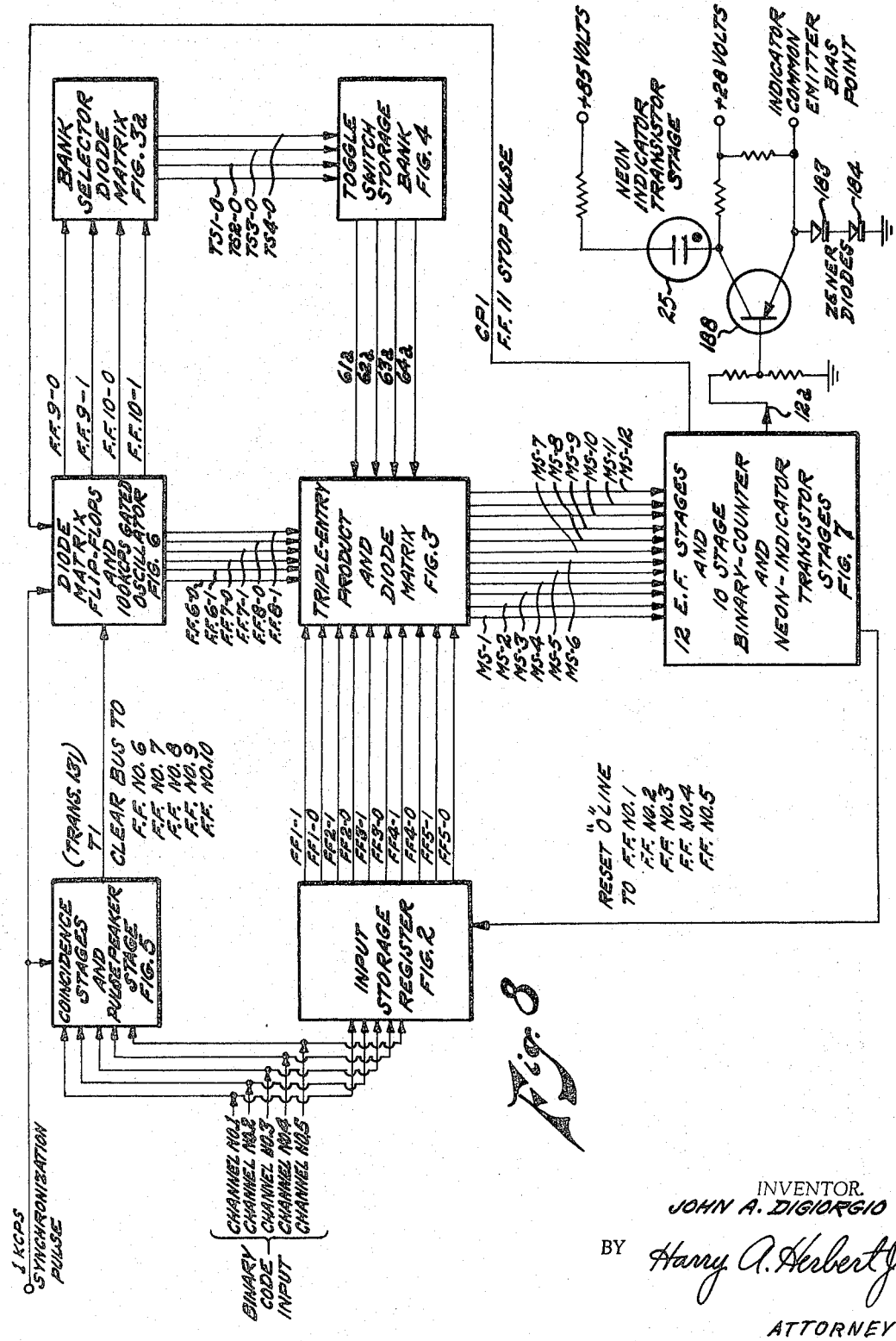

United States Patent Office 3,310,776
Patented Mar. 21, 1967

3,310,776
AUTOMATIC BINARY-CODE ERROR
DETECTING SYSTEM
John A. Di Giorgio, Boston, Mass., assignor to the United
States of America as represented by the Secretary of
the Air Force
Filed Sept. 28, 1960, Ser. No. 59,122
4 Claims. (Cl. 340—146.1)

The invention described herein may be manufactured and used by or for the United States Government for governmental purposes without payment to me of any royalty thereon.

This invention relates to error detecting systems, and more particularly to an airborne, automatic, binary-code error detector and counter unit for evaluating the reliability of an air-ground communication system.

In the transmission of binary coded information, the assurance that accurate, error-free, communication is maintained at all times, is of primary importance. Since a single error will give a wrong answer for an entire series of computations, it is necessary that apparatus for determining the reliability of such a system, and for monitoring its operation, be used in conjunction therewith.

The systems thus far developed in the prior art to accomplish this purpose are each subject to one or more serious limitations that reduce their practicability.

In one known system, the data to be transmitted is duplicated, and both the original and duplicate information data are simultaneously transferred through the transfer medium and compared at the receiver. Thus any error in the transfer would be indicated by any dissimilarity between the original and duplicate data. This system, in addition to the redundant circuitry required, provides an ambiguous result in that it is impossible to determine whether or not the error resides in the original or the duplicate data.

Another method currently in use is that of selectively complementing the binary digits of a predetermined indicator datum in accordance with corresponding binary digits of the datum group at the source and at the receiver to form a monitor datum. This system, however, provides no way of differentiating errors in the monitoring code from errors in the message being transmitted.

Two other known systems are "the code selection error checking system," which employs the technique of selecting a code which will provide the same number of binary 1's or 0's for each information datum, and the "parity checking system," which comprehends adding a single binary digit to each datum-representing code group in order to provide code groups having an even number of binary 1's or 0's. These systems have the inherent disadvantage of not detecting transpositional errors wherein the order or position of the binary digits is incorrectly transferred but the binary 1 or 0 count remains unchanged.

Still another class of prior art checking circuit depends, for its operation, on marginal or amplitude sensitive devices which relate to the intensity of the various input signals. Although operative, this class of circuit is critical in its operation inasmuch as accurate signal strengths are essential to the criteria examined.

Accordingly it is a primary object of this invention to provide an automatic binary-code error detecting system that will accurately determine the reliability of a coded communication system.

It is a further object of this invention to provide an error detecting system of the type described that will automatically detect and record any discrepancies in the message being transmitted.

It is a still further object of this invention to provide a novel airborne transistorized automatic binary-code error detector and counter unit for evaluating a communication system.

These and other objects, together with the novel features which are believed to be characteristic of my invention will become apparent from the following description taken in conjunction with the accompanying drawings, in which:

FIG. 4 illustrates the toggle switch storage stage of said specific embodiment of my invention;

FIG. 5 is a detailed schematic diagram of the synchronizing stage of said specific embodiment of my invention;

FIG. 6 is a detailed schematic diagram of the cycling stage of said specific embodiment of my invention;

FIG. 7 is a detailed schematic diagram of the recording and indicating stages of said specific embodiment of my invention; and FIG. 8 is a block diagram showing the sequences and interconnections between FIGS. 2 to 7.

The airborne transistorized automatic binary-code error detector and counter unit to be described herein as illustrative of one presently preferred embodiment of my invention is an electronic device especially adapted for use with a binary data transmission system. This specific embodiment, which is intended to be exemplary of the principles of my invention only and not a limitation thereto, comprehends a five-channel multiplexed system wherein the airborne receiver output is presented in parallel form on five input channels, with a 1 kc./s. synchronizing pulse for timing being available on a sixth input channel.

A stereotyped message used successfully in the present error detecting system is illustrated in the following table entitled "Binary-code scheme and associated timing diagram."

CODE

| Receiver Channel | No. 1 | No. 2 | No. 3 | No. 4 |
|---|---|---|---|---|
| No. 1 | 1 | 0 | 1 | 0 |
| No. 2 | 1 | 1 | 0 | 0 |
| No. 3 | 1 | 0 | 1 | 0 |
| No. 4 | 1 | 1 | 0 | 0 |
| No. 5 | 1 | 0 | 1 | 0 |
| 1 kc./s. synchronization. | 1 | 1 | 1 | 1 |
| Pulse | →| 1 millisecond 1 |←  | | |

In addition to the frame synchronization, which is supplied, a program synchronization is generated by means of a 1's coincidence in all channels which identified Frame No. 1.

Figure 1:
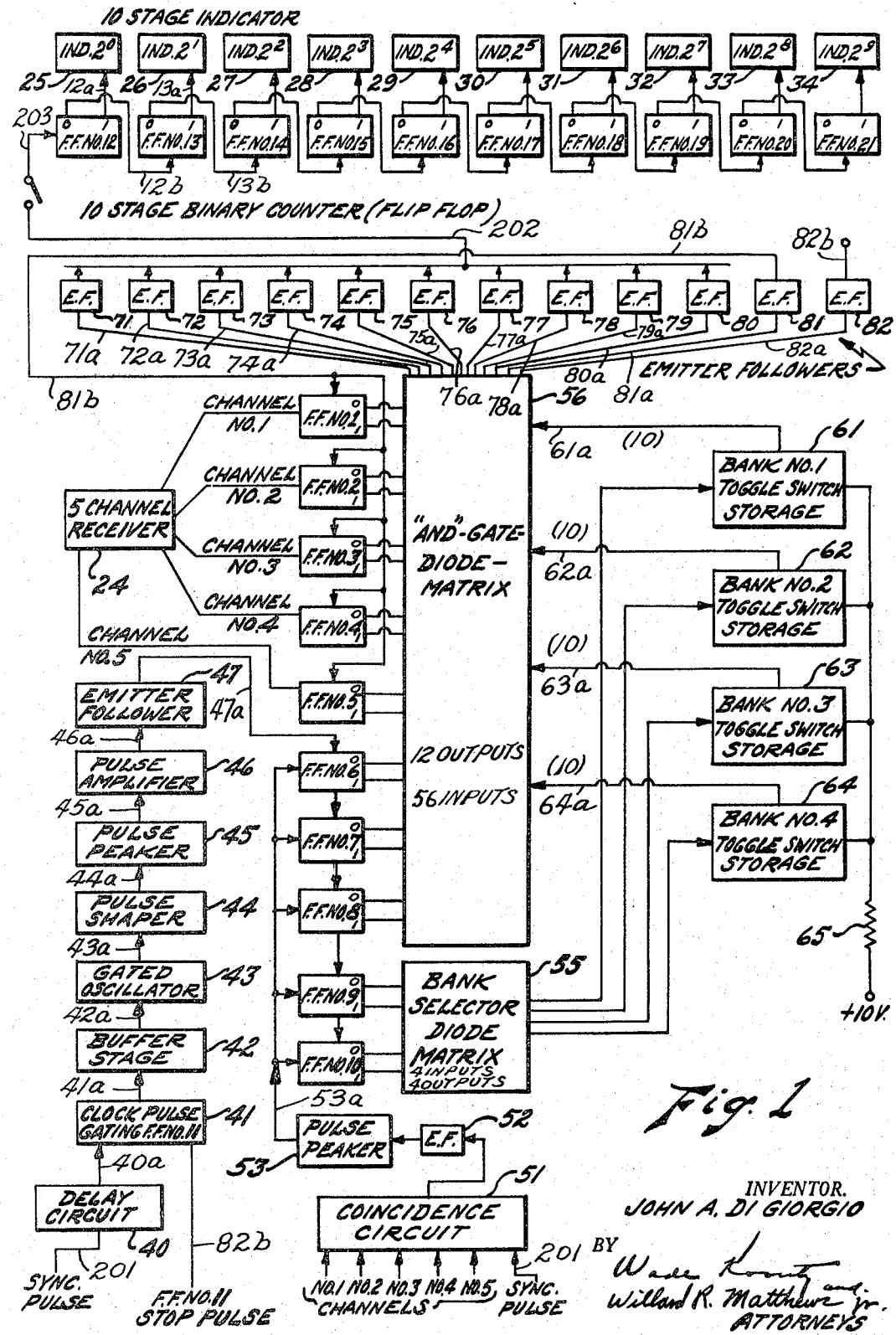
FIG. 1 is a block diagram of one specific illustrative embodiment of my invention.

Referring now to FIG. 1, flip-flops Nos. 1, 2, 3, 4 and 5 receive the binary code on parallel input channels 1, 2, 3, 4, and 5 from five channel receiver 24. The flip-flop collector outputs are set to a particular D.C. voltage pattern constituting a "0" or a "1."

The input storage register includes the five transistor flip-flop stages designated as Nos. 1, 2, 3, 4 and 5 that receive on five parallel lines the code groups Nos. 1, 2, 3, and 4 from five-channel receiver 24. As each binary code group is received, the five flip-flop collector outputs are set to a particular D.C. voltage pattern. Each flip-flop will be set to a "0" or "1" by the pulse code received. And-gate-diode-matrix 56 compares, sequentially, the D.C. voltage gate levels set in each of the five flip-flops by the five-receiver outputs with those manually preset in its corresponding toggle switch storage bank. If the received data information is incorrect and-gate-diode-matrix 56 generates an error pulse which will appear on lead 202.

Since every binary digit in the input code is compared for correctness, an error pulse can occur on any one of the five output-line pairs 71a–80a. After completing this check the reset "0" line 81b from and-gate-diode-matrix 56 resets flip-flops Nos. 1, 2, 3, 4, and 5 so that they are ready to receive the next pulse code. Flip-flops Nos. 6, 7 and 8 sequence through all output lines of diode matrix 56. Flip-flops Nos. 9 and 10 sequence through the four toggle switch storage banks. Oscillator 43 is gated "ON" and "OFF" by means of the clock pulse gating FF No. 11 output voltage waveform. The duration of this voltage gate waveform is determined by means of the externally supplied 1 kc./s. (delayed) synchronization "start" trigger pulse and the "stop" line to clock pulse gating FF No. 11 from the diode matrix (lead 82b) which terminates the gate. The 1-kc./s. synchronization pulse from five channel receiver 24 is delayed five microseconds in delay circuit 40 which comprises a one shot multivibrator, a differentiating circuit, and a pulse amplifier (see FIG. 6). This pulse also serves as a delayed start pulse (lead 40a) to FF No. 11. During this delay time there is sufficient time to read into FF's Nos. 1, 2, 3, 4 and 5 the binary code from receiver 24, and also clear flip-flops Nos. 6, 7, 8, 9 and 10 which drive the triple-entry-product matrix of and-gate-diode-matrix 56 and bank-selector-diode-matrix 55.

There are two diode-matrix units in the subject detector. The larger, and-gate-diode-matrix 56, functions as a triple-entry-product "And" gate where the D.C. voltage gate levels on the selected output line (determined by flip-flops Nos. 6, 7 and 8) are compared with those from the five input flip-flops and the toggle-switch storage bank. For a three-input "And" gate to have a high output all three of the inputs the intelligence being checked, the stored information, and the frame selecting information must be high. If one or more of these inputs is low, the output will be low. The high condition is indicated by 10 volts and the low condition by 0 volts. Flip-flops Nos. 6, 7, and 8 sequence through all output lines of and-gate-diode-matrix 56 in the proper order.

Figure 3:
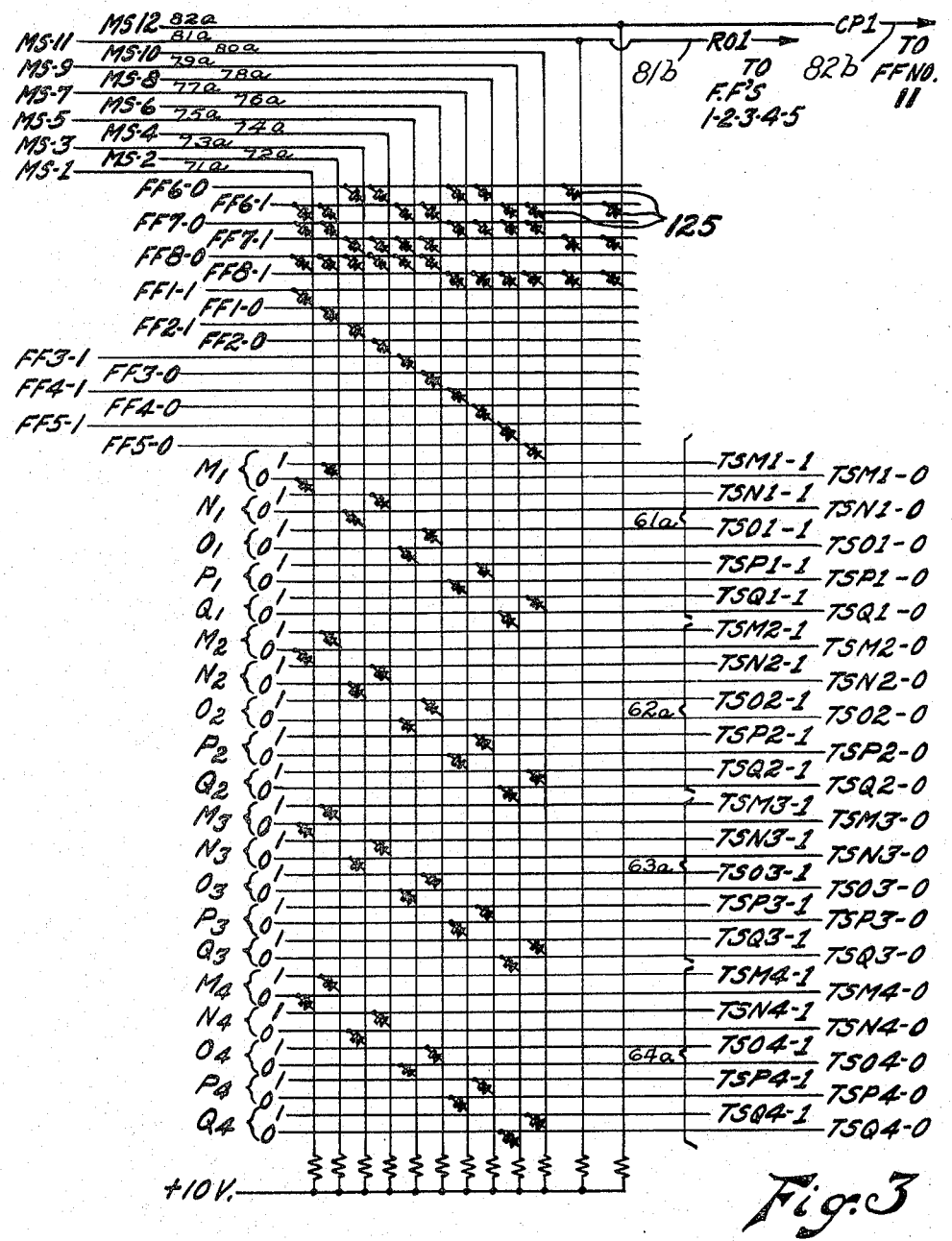
FIGS. 3 and 3a illustrate the matrix switch comparator stages of said specific embodiment of my invention.

Provision for changing the combinations of the D.C. output voltage levels of toggle-switch storage is provided by bank-selector-diode-matrix 55 in cooperation with flip-flops Nos. 9 and 10. A double pole double throw switch (see FIG. 4) is provided for each binary digit in the code. There are four switch banks, 61 through 64, one for each code. Each switch bank has two input terminals, one supplied with 10 volts through common resistor 65, and the other connected to its respective position on the bank selector. All forty output leads (the leads 61a, 62a, 63a and 64a of FIG. 1, each represents 10 leads as can be seen in FIGURES 3 and 4) of the toggle-switch storage banks are then connected into and-gate-diode-matrix 56.

Flip-flops Nos. 6, 7, 8, 9, and 10 receive clock pulses for timing during every frame from emitter follower 47 and a "program" synchronization trigger from coincidence circuit 51. This latter pulse triggers one side of the flip-flops Nos. 6, 7, 8, 9 and 10 so that they will be ready to cycle through the next sequence of codes. Once the code error detector is properly synchronized, occasional errors in Code No. 1 will not disrupt the program synchronization.

A ten stage binary counter is provided comprising flip-flops, 12 through 21, and indicators 25 through 34 being arranged to have a two-transistor flip-flop and a neon-indicator transistor circuit in each stage (see FIG. 7).

The twelve output lines 71a–82a on and-gate-diode-matrix 56 have emitter followers 71 through 82 connected thereto to provide power output and to avoid loading the inputs and outputs of the gate. Any error pulses that do occur are collected on a common output line 202.

For the purpose of providing a more detailed description of the subject invention reference is now made to FIGS. 2 through 7, which figures comprise a complete schematic diagram of the unit as shown in the block diagram of FIG. 8 which shows the sequences and interconnections between FIGS. 2 to 7. Logical circuitry is used throughout. Some of the basic circuits used are flip-flops, gated oscillators, pulse amplifiers, emitter followers, and diode matrix switches. All information flows in the form of narrow pulses and flip-flop output D.C. voltage levels are used for gate-control information.

Figure 2:
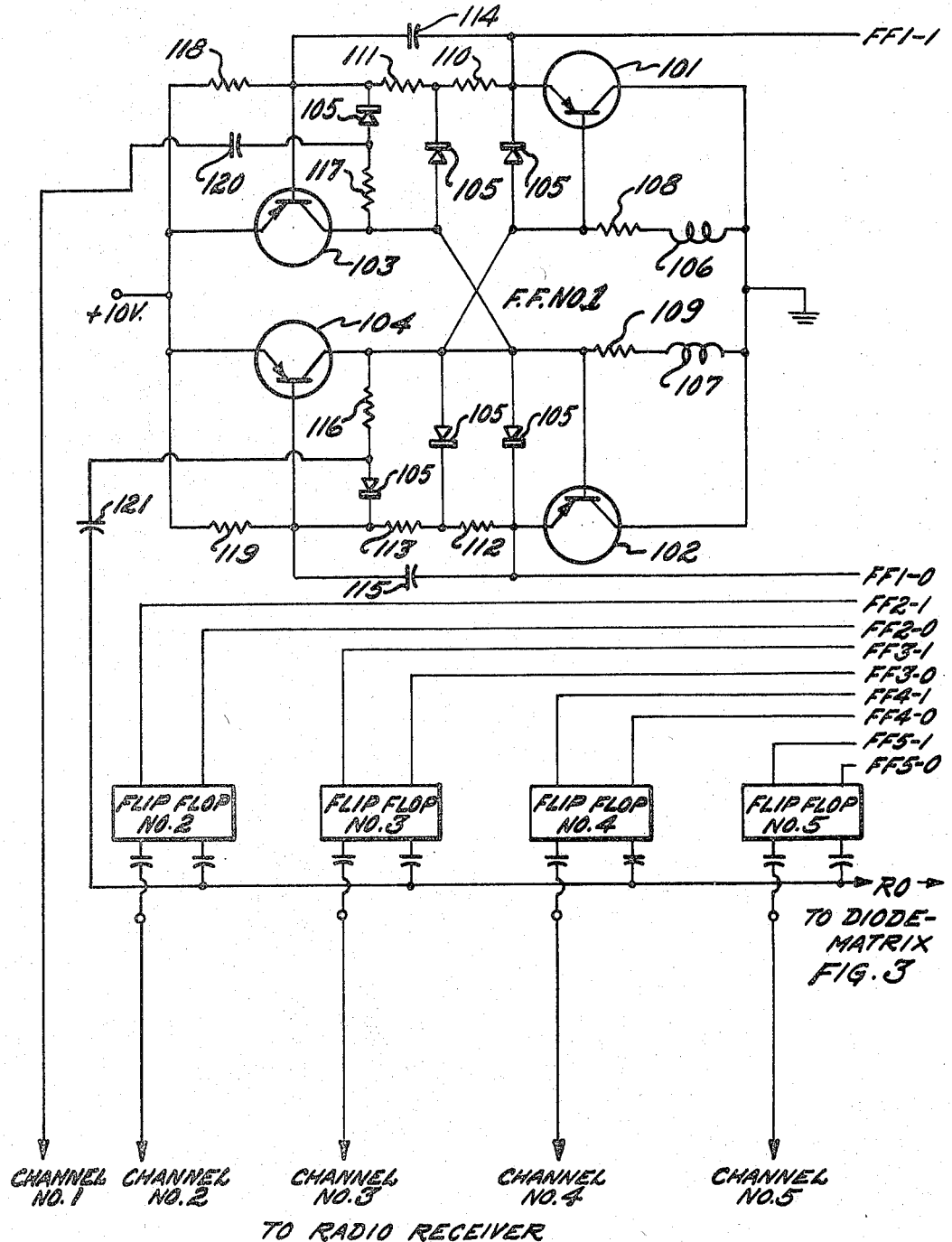
FIG. 2 is a detailed schematic diagram of the input stage of said specific embodiment of my invention.

The circuit for a typical flip-flop is illustrated by flip-flop No. 1 of FIG. 2. Said flip-flop, which is a bistable device that may be switched from one state to the other, consists of an Eccles-Jordan circuit having PNP transistors 103, 104 with emitter followers 101, 102 connected to each side. Emitter followers 101, 102 are so connected to the flip-flop collectors that the output is held to a level of from 0 to 9 volts. Pulse steering is accomplished by means of resistor and diode networks between collector and base electrode. Positive pulses are gated onto the base of the "ON" transistor with a resulting switching action that turns the transistor "OFF." The minimum trigger pulse required for the flip-flop was approximately three volts with a pulse-width variation of from 1 to 10 microseconds. Since the circuit arrangement of flip-flop No. 1 is typical of the several flip-flops used in my invention, and like components are used throughout, the following table of values for said components which have been found to provide an operable device is included by way of example:

| | |
|---|---|
| Transistors 101, 102, 103 and 104 | GE Type 2N123 |
| Crystal diodes 105 | Hughes Type 1N89 |
| Inductance coils 106, 107 | microhenries __ 100 |
| Resistors 108, 109 | ohms __ 1.2K |
| Resistors 110, 112 | do __ 4.7K |
| Resistors 111, 113 | do __ 1.2K |
| Capacitors 114, 115 | micro-microfarads __ 68 |
| Resistors 116, 117 | ohms __ 10K |
| Resistors 118, 119 | do __ 3.9K |
| Capacitors 120, 121 | micro-microfarads __ 200 |

Figure 3A:
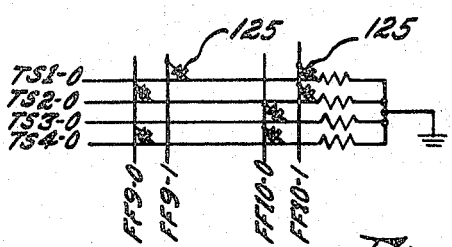

FIG. 3 illustrates the conventional triple entry product "AND" gate designated "and-gate-diode-matrix 56" in FIG. 1, which, together with the bank-selector-diode-matrix illustrated in FIG. 3a, comprises the comparator stage of my invention. Crystal diodes 125 are Hughes Type 1N89 and are used throughout.

The pre-set storage stage of my invention is illustrated by the four bank arrangement of double pole-double throw toggle switches $M_1$–$Q_4$ in FIG. 4.

FIG. 5 illustrates the cycling network synchronizing circuitry wherein channels Nos. 1 through 5, as well as the 1 kc./s. synchronizing pulse, are each connected through a .01 microfarad capacitor and a crystal diode to common bus 134. Emitter follower transistor 132, amplifier 133, and transformer 131 together with their associated circuit components, as illustrated, comprise the remainder of the synchronizing stage.

The 1 kc./s. synchronization pulse referred to above relating to FIG. 5 is simultaneously applied to the delay circuit illustrated in FIG. 6, said delay circuit comprising transistors 141, 142 and 143, transformer 144 and associated circuit components. After a five microsecond delay, the output of said delay circuit acts as a start pulse for clock pulse gating flip-flop No. 11. Push button switch 145 is provided to set flip-flop 11 initially in the proper state. The output of flip-flop 11 is then applied to circuitry which includes a 100 kc./s. gated oscillator means, pulse shaping means, and amplifier means. This circuitry is shown in FIG. 6 as comprising transistors 147, 148, 149, 150, 152, and 154, transformer 151 and 153, regulating zener diode 146 and associated components as illustrated. The output of this circuit is then applied to flip-flop No. 6 and provides further cycling through flip-flops Nos. 7 through 10.

The indicator stage of my invention is illustrated schematically in FIG. 7. The output of and-gate-diode-matrix 56 is amplified by emitter followers 71 through 82 and applied by means of switching diodes 171 through 180 to collector bus 170. Any error pulse appearing on said collector bus 170 actuates the appropriate flip-flop in the binary counter, which counter comprises flip-flops Nos. 12 through 21. Flip-flop 12 which is typical of each of said flip-flops is shown in detail in FIG. 7 and includes transistors 181 and 182, silicon diodes 183, 184, and clear push button 187. The output of said flip-flop 12 is then applied through emitter follower 188 to neon light 25 thereby providing visual indication of any detected error.

There has thus been disclosed novel apparatus and circuitry whereby the several objects of my invention are accomplished.

While there has been described but a single embodiment of my invention, it is to be understood that many changes or modifications can be made therein without departing from the spirit of the invention and it is not desired, therefore, to limit the scope of the invention except as pointed out in the appended claims or as dictated by the prior art.

I claim:

1. An automatic binary code error detector comprising, a multi-channel binary code receiver, a bi-stable switching device associated with each channel of said receiver, storage means, said storage means being adapted to provide a stereotyped message in binary form, comparator means comprising an "AND" matrix and a bank-selector-matrix, a set of circuits including a first circuit for entering information from said binary-code receiver into said "AND" matrix, a second circuit for sequencing said stereotyped message through said "AND" matrix in cooperation with said bank-selector matrix, a third circuit for sequencing through all output lines of said "AND" matrix, and a fourth circuit for cycling the several outputs of each channel of said multi-channel binary code receiver through both said matrices, means for synchronizing said cycling means, and indicator means for indicating discrepancies between said binary code receiver output and said stereotyped message and wherein said comparator means comprises a triple-entry product and gate diode matrix.

2. An automatic binary code error detector in accordance with claim 1 wherein said cycling means comprises clock pulse gating means, means for supplying a delayed synchronizing pulse thereto, oscillator means, and amplifier means.

3. An automatic binary code error detector in accordance with claim 1 wherein said means for synchronizing said cycling means comprises a common bus and means for providing thereto a synchronizing pulse together with the outputs of the several binary code receiver channels.

4. An automatic binary code error detector in accordance with claim 1 wherein said indicator means comprises a plurality of switching diodes, a common collector bus, and binary counter means, said switching diodes being adapted to actuate said binary counter means in response to the output of said comparator means.

References Cited by the Examiner

UNITED STATES PATENTS

| | | | |
|---|---|---|---|
| 2,702,380 | 2/1955 | Brustman et al. | 340—147 |
| 2,719,959 | 10/1955 | Hobbs | 340—147 |
| 2,849,532 | 8/1958 | Hennig | 340—147 |
| 3,027,542 | 3/1962 | Silva | 340—146.1 |

MALCOLM A. MORRISON, *Primary Examiner.*

IRVING L. SRAGOW, F. G. NIEMAN, M. P. ALLEN, M. SPIVAK, *Assistant Examiners.*